Oct. 4, 1955          A. MURRAY          2,719,501
TOOL FOR LOCKING A PIPE WITHIN A BUSHING
Filed Feb. 23, 1954
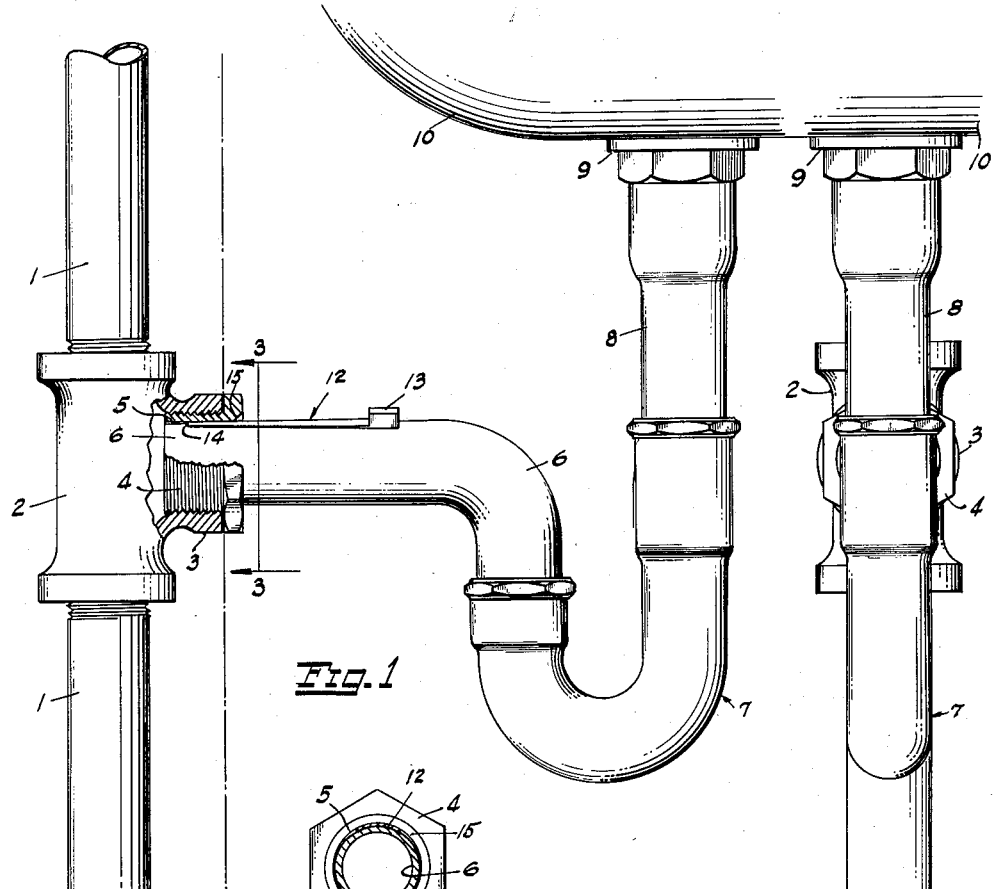
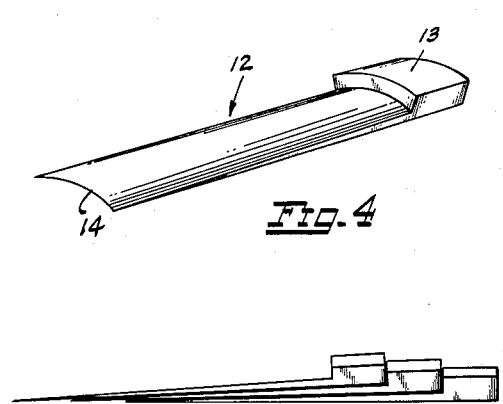
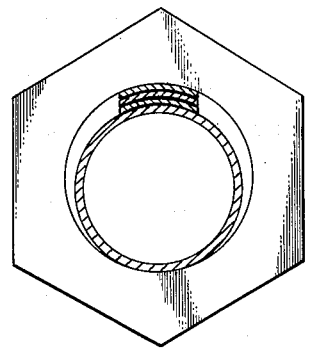

United States Patent Office 2,719,501
Patented Oct. 4, 1955

2,719,501

TOOL FOR LOCKING A PIPE WITHIN A BUSHING

Alexander Murray, Vancouver, Wash.

Application February 23, 1954, Serial No. 411,798

1 Claim. (Cl. 113—111)

This invention relates to improvements in plumber's tools and more particularly to a tool in the form of a wedge for locating and temporarily locking the horizontal outlet pipe of a sink trap within a slip joint or bushing by means of which the trap is finally permanently connected to a T-fitting in a drain-pipe after the slip joint and trap pipe have been soldered together.

When installing a sink or the like it is important that the P-trap and the horizontal and vertical pipes thereof be aligned in a vertical plane not only to insure a perfect and leak-proof fit of all the parts but also to render the completed installation neat in appearance.

Heretofore when endeavoring to accomplish this result it was first necessary for the plumber to mount the sink to a wall or other support, attach the P-trap by means of its vertical pipe to the sink, and then cut the horizontal outlet pipe of the trap to the proper length to enable it to extend a sufficient distance into the slip joint of the bushing, and then secure the bushing in the T-fitting of the drain-pipe within a wall to determine that all of the parts will be of proper length when finally and permanently installed. After completion of this trial set-up it was then necessary to disassemble the horizontal pipe from the trap and from the bushing; to remove the bushing from the T-fitting, place it endwise on a horizontal support, then by guesswork vertically re-insert the horizontal pipe of the trap into the bushing the same distance it was when temporarily assembled, then unite the two by soldering, the soldering had to be accomplished while preventing any relative rectilinear or rotary movement of the pipe and bushing with the hope that the two parts would be in the same position they had been in the trial installation.

The objects of the invention will appear as it is more fully hereinafter described in the following specification, illustrated in the accompanying drawings, and finally pointed out in the appended claim.

In the drawings:

Figure 1 is a side view of a P-trap temporarily locked to a slip joint in a bushing by means of a wedge made in accordance with my invention and by means of the bushing to a T-fitting in a vertical drain-pipe.

Figure 2 is a front view of Figure 1.

Figure 3 is a sectional view taken along the line 3—3 of Figure 1.

Figure 4 is a perspective view of the wedge shown in Figure 1.

Figure 5 is a side view of a plurality of the wedges stacked for insertion between a pipe and bushing to gain increased wedging action as illustrated in Figure 6, wherein the pipe and wedges are shown in section.

Referring now more particularly to the drawing:

In Figure 1 reference numeral 1 indicates a standard vertical drain-pipe disposed within a wall one of whose surfaces is shown by a broken line. The pipe is connected to a T-fitting 2 also disposed within the wall but having one branch 3 terminating flush with the surface thereof to receive an externally threaded bushing 4 in the usual manner. In the plumbing trade the bushing is referred to as a "slip-joint," since its smooth inner periphery 5 is adapted to receive by a sliding fit one end of a horizontal pipe 6 of a P-trap 7 connected to the bottom end of a vertical pipe 8 whose top end is connected as at 9 to a sink basin or the like, a fragment of which is indicated at 10.

To obviate the difficulties and uncertainties of repositioning the end of the pipe 6 and the bushing 4 when the pipe and bushing have been removed from the wall for the soldering operation I provide a wedge for securing the pipe to the bushing so that they can be removed from the T-fitting as a solid unit, then soldered and reunited with the T-fitting without disturbing the required relationship arrived at in the trial installation.

The wedge as best illustrated in Figure 4 comprises a main body 12 of arcuate shape in cross-section formed with a head 13 on one side of one of its ends and gradually tapered to a knife-edge 14 at its opposite end to facilitate its initial insertion between the pipe 6 and the inside wall 5 of the bushing 4. By light hammer blows against the head 13 in the direction of the length of the wedge the latter can be driven inwardly the required distance to securely lock the pipe to the bushing, the bushing having been previously secured to the branch of the T-fitting by advancement on its threads to the limit of rotation by the use of a wrench. With the pipe 6 thus locked to the bushing, the pipe and bushing can be removed as a unit, soldered, and replaced. The solder is neatly confined within an annular groove 15 in the outer face of the bushing 4. Just prior to completing the ring of solder as shown in Figure 3 the wedge can be conveniently removed by hammer blows on the inside shoulder 16 of the head of the wedge. When the bushing is again driven to its limit into the branch 3 of the T-fitting 2, the pipe 6 will resume the same position it had in the trial installation and the P-trap, its vertical pipe 8, and the downwardly turned outer portion of the pipe 6 will all be in the desired vertical alignment as aforesaid and as shown in Figure 2.

The wedge is preferably made of spring steel so as to render it self-conforming to the peripheral surfaces of pipes and bushings of various diameters.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

A tool of the class described comprising an elongated body member made of spring steel of arcuate shape in cross-section and of uniform width throughout its length and transversely yieldable for the major portion of its length, one end of the body member being enlarged in thickness to form a head on one side thereof, the head being equal in width to that of the body member and terminating at its inner end in a shoulder, and said one side of the body member being gradually tapered from said shoulder to a knife-edge at the opposite end of the body member whereby the body member can by pressure applied to the outer end of the head be driven between the outer surface of a pipe within a bushing and the inner surface of the bushing and conform to the diameters thereof in wedged engagement therewith at any point between its knife-edge and said shoulder and whereby the body member can be driven out of said engagement by pressure applied to said shoulder at the inner end of the head.

References Cited in the file of this patent

UNITED STATES PATENTS

| | | |
|---|---|---|
| 1,250,881 | Hodges | Dec. 18, 1917 |
| 1,404,650 | Richard | Jan. 24, 1922 |

FOREIGN PATENTS

| | | |
|---|---|---|
| 55,477 | Sweden | Oct. 30, 1923 |